(12) United States Patent
Patino-Bueno et al.

(10) Patent No.: US 11,593,072 B2
(45) Date of Patent: *Feb. 28, 2023

(54) COMPOSITIONAL ENTITY MODELING SYSTEMS AND METHODS

(71) Applicant: OPEN TEXT SA ULC, Halifax (CA)

(72) Inventors: John Patino-Bueno, Hudson, NH (US); Cheranthian Muthuvinayagam, Bedford, NH (US); David Ernest Jenkins, Gardner, MA (US); Richard Winfield Bolling, Hollis, NH (US); John Martin Pratt, Atkinson, NH (US); Michael Robert Spampinato, Salem, NH (US); Dana Lawrence Khoyi, Westford, MA (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,238

(22) Filed: Jul. 27, 2020

(65) Prior Publication Data

US 2020/0356347 A1 Nov. 12, 2020

Related U.S. Application Data

(63) Continuation of application No. 16/004,043, filed on Jun. 8, 2018, now Pat. No. 10,740,069, which is a
(Continued)

(51) Int. Cl.
*G06F 9/44* (2018.01)
*G06F 8/20* (2018.01)
(Continued)

(52) U.S. Cl.
CPC .............. *G06F 8/20* (2013.01); *G06F 3/0482* (2013.01); *G06F 3/0484* (2013.01); *G06F 8/36* (2013.01)

(58) Field of Classification Search
CPC ........................................................ G06F 8/20
(Continued)

(56) References Cited

U.S. PATENT DOCUMENTS 6,199,195 B1 3/2001 Goodwin
6,560,633 B1 5/2003 Roberts et al.
(Continued)

OTHER PUBLICATIONS

Office Action for U.S. Appl. No. 15/587,014, dated Oct. 28, 2020, 19 pgs.
(Continued)

*Primary Examiner* — Francisco J Aponte
(74) *Attorney, Agent, or Firm* — Sprinkle IP Law Group

(57) ABSTRACT

An entity modeling system integrated with a low-code application development platform may have a web/mobile-based user interface that can run in a browser environment on user devices ranging from desktop computers to smart phones. Users such as a subject matter expert may access an entity model designer tool of the system to model an entity. Responsive to user interaction with an entity composition function, the system may access a data store over a network and generate a view including a collection of entity building block(s) retrieved from the data store. Responsive to the user selecting a first entity building block from the collection to add to the entity, the system may automatically extend the entity to include settings of the first entity building block. The settings may include at least one of a property, permission, action, behavior, or resource to the entity.

17 Claims, 9 Drawing Sheets

Related U.S. Application Data continuation of application No. 15/189,335, filed on Jun. 22, 2016, now Pat. No. 10,019,238.

(60) Provisional application No. 62/183,232, filed on Jun. 23, 2015.

(51) Int. Cl.
  *G06F 3/0482* (2013.01)
  *G06F 3/0484* (2022.01)
  *G06F 8/36* (2018.01)

(58) Field of Classification Search
  USPC .......................................................... 717/105
  See application file for complete search history.

(56) References Cited

U.S. PATENT DOCUMENTS

| | | | |
|---|---|---|---|
| 6,640,249 B1 | 10/2003 | Bowman-Amuah | |
| 6,823,522 B1 | 11/2004 | Lamb | |
| 6,986,120 B2 | 1/2006 | Reddy | |
| 7,404,175 B2 | 7/2008 | Lee | |
| 7,523,440 B2* | 4/2009 | Torgerson | G06F 8/38 717/110 |
| 7,606,739 B1 | 10/2009 | Johnson | |
| 7,681,176 B2* | 3/2010 | Wills | G06F 8/34 717/109 |
| 7,752,559 B1 | 7/2010 | Szpak | |
| 7,757,204 B2* | 7/2010 | Fildebrandt | G06F 8/10 717/104 |
| 7,765,519 B2 | 7/2010 | Lunawat | |
| 7,823,121 B1* | 10/2010 | Zarrinkoub | G06F 8/34 717/109 |
| 7,840,936 B2 | 11/2010 | Seeger | |
| 7,865,820 B2 | 1/2011 | Sauer et al. | |
| 7,877,397 B2 | 1/2011 | Nagarajan et al. | |
| 7,895,568 B1 | 2/2011 | Goodwin | |
| 7,900,186 B2 | 3/2011 | Lucassen | |
| 7,957,992 B2* | 6/2011 | Gilbert | G06Q 10/063 705/7.38 |
| 8,015,541 B1 | 9/2011 | Srinivasan | |
| 8,078,597 B2 | 12/2011 | Polk | |
| 8,126,937 B2 | 2/2012 | Shaburov | |
| 8,150,886 B2 | 4/2012 | Rhodes et al. | |
| 8,185,643 B2 | 5/2012 | McMullen | |
| 8,234,105 B1* | 7/2012 | Aldrich | G06F 11/3684 703/22 |
| 8,234,630 B2* | 7/2012 | Raghavan | G06F 8/34 717/125 |
| 8,239,226 B2 | 8/2012 | Van Wyk et al. | |
| 8,255,818 B2 | 8/2012 | Bales | |
| 8,261,233 B2 | 9/2012 | Szpak | |
| 8,336,025 B1* | 12/2012 | Hosagrahara | G06F 8/24 717/111 |
| 8,386,996 B2* | 2/2013 | Prigge | G06Q 10/10 717/104 |
| 8,463,634 B2* | 6/2013 | Kulkarni | G06Q 10/0631 705/7.12 |
| 8,584,088 B1 | 11/2013 | Carrick | |
| 8,627,272 B1* | 1/2014 | Lin | G06F 11/3696 717/113 |
| 8,645,914 B2* | 2/2014 | Repenning | G06F 11/3664 717/113 |
| 8,762,934 B2 | 6/2014 | Sarafudinov | |
| 8,769,490 B2 | 7/2014 | Poulsen et al. | |
| 9,075,959 B2 | 7/2015 | Chouinard | |
| 9,088,463 B1 | 7/2015 | Boynes | |
| 9,152,393 B1* | 10/2015 | Mani | G06F 8/34 |
| 9,158,503 B2 | 10/2015 | Misbhauddin et al. | |
| 9,305,275 B2 | 4/2016 | Mclachlan | |
| 9,411,559 B2* | 8/2016 | Avadhanula | G06F 8/35 |
| 9,536,023 B2* | 1/2017 | Englehart | G06F 9/541 |
| 9,959,100 B2 | 5/2018 | Straub | |
| 10,019,238 B2 | 7/2018 | Patino-Bueno et al. | |
| 10,169,004 B2 | 1/2019 | Khoyi et al. | |
| 10,180,823 B2 | 1/2019 | Collins | |
| 10,552,124 B2 | 2/2020 | Collins | |
| 10,732,939 B2 | 8/2020 | Patino-Bueno et al. | |
| 10,740,069 B2 | 8/2020 | Patino-Bueno | |
| 11,294,646 B2 | 4/2022 | Khoyi | |
| 2001/0052910 A1 | 12/2001 | Parekh et al. | |
| 2002/0078433 A1 | 6/2002 | Rajarajan | |
| 2002/0108099 A1 | 8/2002 | Paclat | |
| 2004/0083199 A1 | 4/2004 | Govindugari et al. | |
| 2004/0139426 A1 | 7/2004 | Wu | |
| 2004/0148586 A1 | 7/2004 | Gilboa | |
| 2004/0153992 A1 | 8/2004 | Molina-Moreno | |
| 2004/0210831 A1* | 10/2004 | Feng | G06F 30/20 715/211 |
| 2005/0044527 A1 | 2/2005 | Recinto | |
| 2005/0080640 A1 | 4/2005 | Bhaskaran et al. | |
| 2005/0102199 A1 | 5/2005 | Lee | |
| 2005/0165822 A1 | 7/2005 | Yeung | |
| 2006/0075382 A1 | 4/2006 | Shaburov | |
| 2006/0168577 A1 | 7/2006 | Melo et al. | |
| 2006/0228654 A1 | 10/2006 | Sanjar | |
| 2007/0106520 A1* | 5/2007 | Akkiraju | G06Q 30/02 717/105 |
| 2007/0179828 A1 | 8/2007 | Elkin | |
| 2007/0261027 A1 | 11/2007 | Dhanakshirur | |
| 2007/0266041 A1 | 11/2007 | Beckman et al. | |
| 2007/0283318 A1* | 12/2007 | Tong | G06F 8/10 717/104 |
| 2007/0288887 A1 | 12/2007 | Pepin et al. | |
| 2008/0059945 A1* | 3/2008 | Sauer | G06Q 10/10 717/105 |
| 2008/0082959 A1 | 4/2008 | Fowler | |
| 2008/0163161 A1 | 7/2008 | Shaburov | |
| 2008/0189679 A1 | 8/2008 | Rodriguez | |
| 2008/0201338 A1 | 8/2008 | Castro et al. | |
| 2008/0288917 A1 | 11/2008 | Lee | |
| 2009/0006992 A1 | 1/2009 | Gilboa | |
| 2009/0012986 A1 | 1/2009 | Arazi et al. | |
| 2009/0064090 A1 | 3/2009 | Anonsen et al. | |
| 2009/0138307 A1 | 5/2009 | Belcsak | |
| 2009/0182566 A1 | 7/2009 | Erickson | |
| 2009/0281777 A1* | 11/2009 | Baeuerle | G06Q 10/06 703/6 |
| 2010/0050097 A1 | 2/2010 | McGreevy | |
| 2010/0050152 A1 | 2/2010 | Gilboa | |
| 2010/0131857 A1 | 5/2010 | Prigge | |
| 2010/0131916 A1 | 5/2010 | Prigge | |
| 2010/0313182 A1 | 12/2010 | Chen et al. | |
| 2011/0016448 A1 | 1/2011 | Bauder et al. | |
| 2011/0055744 A1 | 3/2011 | Ryan et al. | |
| 2011/0088011 A1 | 4/2011 | Ouali | |
| 2011/0179396 A1 | 7/2011 | Hamilton, II | |
| 2011/0209045 A1 | 8/2011 | Ghosh et al. | |
| 2011/0302556 A1 | 12/2011 | Drukman et al. | |
| 2012/0030573 A1* | 2/2012 | Balko | G06F 8/34 715/735 |
| 2012/0131561 A1 | 5/2012 | Spiess | |
| 2012/0232947 A1 | 9/2012 | Mclachlan et al. | |
| 2013/0085799 A1* | 4/2013 | Zhang | G06Q 10/00 705/7.26 |
| 2013/0103372 A1 | 4/2013 | Hogg | |
| 2013/0318454 A1 | 11/2013 | Gilboa | |
| 2014/0026084 A1 | 1/2014 | Gilboa | |
| 2014/0196007 A1 | 7/2014 | Pointer et al. | |
| 2014/0282367 A1 | 9/2014 | Harrill | |
| 2015/0026223 A1 | 1/2015 | Hahn et al. | |
| 2015/0095880 A1 | 4/2015 | Lee | |
| 2015/0105887 A1 | 4/2015 | Troy | |
| 2015/0154277 A1 | 6/2015 | Thomley | |
| 2015/0242093 A1 | 8/2015 | Yost et al. | |
| 2015/0317331 A1 | 11/2015 | Thomas et al. | |
| 2016/0012162 A1* | 1/2016 | Szpak | G06F 30/20 703/17 |
| 2016/0062745 A1 | 3/2016 | Rao et al. | |
| 2016/0071031 A1 | 3/2016 | Daley | |
| 2016/0077810 A1 | 3/2016 | Bertilsson | |
| 2016/0203538 A1 | 7/2016 | Smits et al. | |

(56) References Cited

U.S. PATENT DOCUMENTS

| | | | |
|---|---|---|---|
| 2016/0203544 A1 | 7/2016 | Smits et al. | |
| 2016/0224909 A1 | 8/2016 | Garrard et al. | |
| 2017/0039040 A1* | 2/2017 | Nayak | G06Q 10/00 |
| 2017/0083292 A1 | 3/2017 | Mclaughlan et al. | |
| 2017/0147311 A1 | 5/2017 | Bregler | |
| 2017/0177310 A1 | 6/2017 | Mathias | |
| 2017/0322716 A1 | 11/2017 | Khoyi et al. | |
| 2018/0136910 A1 | 5/2018 | Noetzelmann | |
| 2018/0321915 A1 | 11/2018 | Patino-Bueno et al. | |
| 2020/0348914 A1 | 11/2020 | Khoyi et al. | |
| 2022/0188080 A1 | 6/2022 | Khoyi | |

OTHER PUBLICATIONS

Office Action for U.S. Appl. No. 15/189,335, dated Nov. 14, 2017, 13 pgs.

Subasi, Artun, "Specification and Generation of User Interfaces Based on Method-Oriented Dialog Flows," University of Kaiserslautern Faculty of Computer Science, May 10, 2011, 94 pgs.

Herczeg, Jurgen, "A Design Environment for Graphical User Interfaces," University of Stuttgart, Germany, 1994, 12 pgs.

Office Action for U.S. Appl. No. 16/004,043, dated Aug. 6, 2019, 15 pgs.

Office Action for U.S. Appl. No. 15/587,014, dated Oct. 16, 2019, 21 pgs.

Office Action for U.S. Appl. No. 16/004,043, dated Jan. 14, 2020, 16 pgs.

Office Action for U.S. Appl. No. 15/587,014, dated Mar. 31, 2020, 26 pgs.

Notice of Allowance for U.S. Appl. No. 16/004,043, dated Apr. 30, 2020, 3 pgs.

Dhrubajyoti Goswami et al., "Architectural Skeletons: The Re-Usable Building-Blocks for Parallel Applications," PDPTA, 1999, 7 pgs.

Arvid Butting et al., "Modeling Language Variability with Reusable Language Components," SPLC '18, Gothenburg, Sweden, Sep. 10-14, 2018, 11 pgs.

Office Action for U.S. Appl. No. 15/587,014, dated May 4, 2021, 22 pgs.

Office Action for U.S. Appl. No. 15/587,014, dated Sep. 24, 2021, 23 pgs.

Notice of Allowance for U.S. Appl. No. 16/932,459, dated Oct. 20, 2021, 7 pgs.

Notice of Allowance for U.S. Appl. No. 16/932,459, dated Feb. 16, 2022, 7 pgs.

Office Action for U.S. Appl. No. 15/587,014, dated Apr. 12, 2022, 21 pgs.

Office Action for U.S. Appl. No. 15/587,014, dated Aug. 15, 2022, 25 pgs.

Notice of Allowance for U.S. Appl. No. 17/689,144 dated Oct. 14, 2022, 7 pgs.

* cited by examiner

700

Results

Filter

Customer Number: 3 - 8 ✕

[Open] [Delete]

▼ Customer Number
○ Equal to  ● Range  ○ Advanced

| 3 | 8 |

▼ Customer Zip Code
● Equal to  ○ Range  ○ Advanced

▼ Customer Name
○ Equal to  ○ Range  ● Advanced contains ▸  Lo

1100

| ☐ Customer Name | Customer Address 1 | Customer Nu... | Customer Zip Code |
|---|---|---|---|
| ☑ John Call | 123 Pulaski Drive | 3 | 03079 |
| ☐ Lori Carter | 69 Hoepker Circle | 4 | 73709 |
| ☐ Lois Young | 26332 Upham Avenue | 5 | 41719 |
| ☐ Theresa Gomez | 4268 Express Court | 6 | 06919 |
| ☐ Andrew Weaver | 1957 Hazelcrest Avenue | 7 | 37316 |
| ☐ Rose Flores | 9 Veith Way | 8 | 09583 |

FIG. 11

COMPOSITIONAL ENTITY MODELING SYSTEMS AND METHODS

CROSS REFERENCE TO RELATED APPLICATIONS

This application is a continuation of, and claims a benefit of priority under 35 U.S.C. § 120 from, U.S. patent application Ser. No. 16/004,043, filed Jun. 8, 2018, issued as U.S. Pat. No. 10,740,069, entitled "COMPOSITIONAL ENTITY MODELING SYSTEMS AND METHODS," which is a continuation of, and claims a benefit of priority under 35 U.S.C. § 120 from, U.S. patent application Ser. No. 15/189,335, filed Jun. 22, 2016, issued as U.S. Pat. No. 10,019,238, entitled "COMPOSITIONAL ENTITY MODELING SYSTEMS AND METHODS," which claims a benefit of priority under 35 U.S.C. § 119(e) from U.S. Provisional Patent Application No. 62/183,232, filed Jun. 23, 2015, entitled "COMPOSITIONAL ENTITY MODELING SYSTEMS AND METHODS." All applications referenced in this paragraph are hereby fully incorporated by reference herein.

TECHNICAL FIELD

This disclosure relates generally to low-code application development platforms. More particularly, this disclosure relates to entity modeling using an application development platform in an enterprise computing environment. Even more particularly, this disclosure relates to systems and methods for compositional entity modeling with reusable and extensible building blocks seamlessly integrating an application development platform with a backend database management system operating over a network in an enterprise computing environment.

BACKGROUND OF THE RELATED ART

In software engineering, an entity model, or entity-relationship model, refers to a particular type of data model that describes and defines a process in a problem domain. This process is modeled as components (entities) that are linked with each other by relationships that specify dependencies and requirements between them.

An entity model can be created by a data modeler using software tools. The entity model thus created can be translated into a physical database design and mapped to physical storage devices by a database administrator (DBA). For example, in the case of a relational database management system which stores data in tables, every row of each table represents one instance of an entity. Some data fields in the tables point to indexes in other tables. Such pointers represent the relationships.

As is known, a database management system is a complex software program that provides users with a systematic way to create, retrieve, update, and manage data. There are a number of problems with an existing approach to entity modeling in an application development environment that relies on data modelers (e.g., the IT staff) knowing how to interact with database management systems, essentially requiring them to have data administration and entity modeling expertise. However, the skills required for entity modeling are different from the skills required for data administration. As such, a data modeler may spend time working on what functionality to add to an entity as well as on figuring out how to correctly and appropriately add that functionality to an entity. What is more, traditional application development approaches require business requirements to be developed and then implemented by the IT staff. This process can take months and requires specialized IT personnel.

Furthermore, the existing approach to entity modeling involves using different software tools. Since the entities and their relationships are stored in a database, these software tools must provide a way to access them in the database. To do so, code for different user interfaces need to be written and implemented and data modelers need to learn how to use these software tools. Moreover, functions provided by one entity modeling tool may not be reusable or extensible by another entity modeling tool.

In view of the foregoing, there is a need for innovations and improvements to entity modeling in enterprise computing environments.

SUMMARY OF THE DISCLOSURE

It is an object of the invention to provide innovations and improvements to entity modeling in enterprise computing environments. In embodiments disclosed herein, this object is realized in an entity modeling system having at least one processor, a data store storing a plurality of entity building blocks, at least one non-transitory computer-readable medium, and stored instructions embodied on the at least one non-transitory computer-readable medium. The plurality of entity building blocks may be created separately and independent of any particular entity to be modeled in a process solution (which is a particular application that is custom developed/built for a problem domain).

The entity modeling system may run on an application development platform for creating process solutions that leverage functionality from various enterprise systems such as case management, process management, content management, and systems integration. Examples of suitable application development platforms may include "low-code" application development platforms. A low-code application development platform, which can also be referred to as "rapid application development," can be defined as one that enables fast application development and delivery with a minimum of manual/hand coding. A low-code application development platform should be easy to deploy and is likely to be used to develop customer-facing software systems. Generally, a low-code application development platform uses visual models to define the various elements of an application, reducing the need for hand-coding and accelerating the development process.

Leveraging this new field in the information technology (IT) realm and taking a compositional approach, embodiments of a low-code application development platform may comprise elements that particularly define an entity modeling system and items that are created by users (e.g., documents, forms, cases, process instances, etc.). What is in an item in this disclosure is defined by a set of elements that have been assembled into an object by a builder. The elements and items on a server machine can be partitioned into separately managed solutions.

A plurality of entity building blocks can represent a subset of the elements of the entity modeling system operating on the particular application development platform. In embodiments disclosed herein, all entity building blocks are elements, but not all elements are entity building blocks.

Each building block comprises code instantiated from a class to implement certain settings that can be added to an entity. Such settings may be structural, decorative, and/or functional. In some embodiments, decorative and functional building blocks are treated the same way—as structural building blocks. In some embodiments, entity building blocks can be used by entity model builders to assemble or compose entities in a particular project via an entity model designer tool of the entity modeling system. Some entity building blocks can be added to an entity many times, while some entity building blocks can only be added once. Since entity building blocks can be created and managed separately and independently of the entities, there is an open-ended set of possible building blocks that can be added to the entities being modeled. This provides a flexible model for extension (e.g., actions, properties, behaviors, user experience (UX) panels, permissions, REST application programming interfaces (RESTful APIs), etc.).

In some embodiments, the entity model designer tool may have a plurality of components including a graphical user interface and an entity composition function. Responsive to an instruction from a user (e.g., an entity model builder) to model an entity, the entity model designer tool may generate a first view containing a name of the entity and the entity composition function and display the first view on the graphical user interface. The user may interact with the entity composition function of the entity model designer tool, for instance, by selecting an add function to add an entity building block to the entity. Responsive to the user interaction with the entity composition function, the entity model designer tool may access the data store (e.g., over a network in a distributed computing environment), generate a second view including a collection of at least one entity building block of the plurality of entity building blocks, and display the second view on the graphical user interface. The user may wish to add a first entity building block from the collection to the entity. Responsive to the user selecting the first entity building block from the collection to add to the entity, the entity model designer tool may automatically extend the entity to include the settings of the first entity building block to the entity. The settings may include at least one of a property, a permission, an action, a behavior, or a resource.

One embodiment comprises a system comprising at least one processor and at least one non-transitory computer-readable storage medium that stores computer instructions translatable by the processor to perform a method substantially as described herein. Another embodiment comprises a computer program product having at least one non-transitory computer-readable storage medium that stores computer instructions translatable by at least one processor to perform a method substantially as described herein.

Numerous other embodiments are also possible.

Embodiments disclosed herein can provide many advantages. For example, entities can now be defined as part of a solution in an entity modeling system running on an application development platform, thereby eliminating the need to define them using another software tool. By bringing the entity model into the solution, any changes to the entity model can be consistently reflected in other models (e.g. removing a property will report an error if that property is used in a form created by a form model). By bringing entities and entity building blocks into the application development platform, the application development platform takes over responsibility for when end-user created item data is fetched and stored. This eliminates a significant source of errors. Furthermore, the low-code application development platform can help users (e.g., subject matter experts) develop applications with limited or no coding knowledge and can run on desktop computers and smart phones alike (e.g., in a browser environment running on such devices). By merging traditional IT and business development groups without requiring an IT staff, the low-code application development platform enables rapid collaborative application development and allows applications to be developed in days and weeks, rather than months or even years.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 11 depicts a diagrammatic representation of an example of filters that can be used with a worklist according to some embodiments.

DETAILED DESCRIPTION

Figure 1:
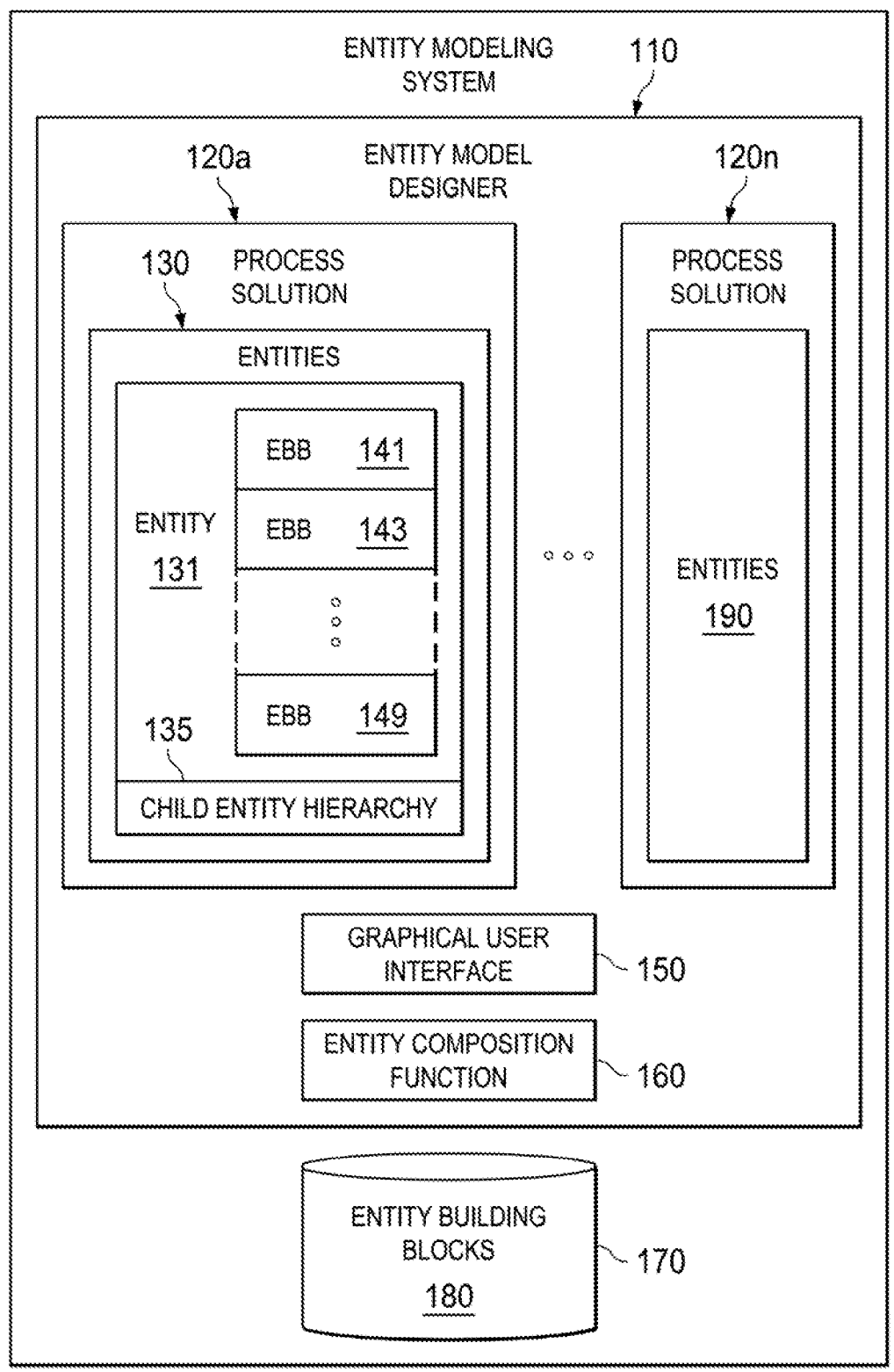
FIG. 1 depicts a diagrammatic representation of an example of an entity modeling system according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As described above, an entity model refers to a particular type of data model that describes and defines a computer-implemented solution process in a problem domain. In computing, such a process (e.g., to eventually find a solution for the problem domain) may result in a computer program product (referred to herein as a solution or application) being created and deployed. Entity modeling may facilitate this process. More specifically, using entity modeling, a solution process can be modeled as entities that are linked with each other by relationships that specify dependencies and requirements between them in the particular problem domain.

For example, an enterprise may need to model a hiring process which involves modeling entities representing positions needed for the enterprise, entities representing job openings for those positions, entities representing applicants applying for the job openings, entities representing information (e.g., résumés, cover letters, contact information, referrals, etc.) associated with each applicant, entities representing hiring managers, entities representing tasks performed by the hiring managers (e.g., candidate interviews, recommendations, etc.), entities representing hiring decisions, etc., and relationships that specify dependencies and requirements between these entities in the hiring process in a human resource (HR) management domain. As another example, in an accounts payable problem domain, a solution process can be defined by a set of entities such as purchase request, purchase order, vendor, invoice, etc. that are linked with each other by relationships that specify dependencies and requirements between them.

Unlike other types of data modeling methods which rely on defining stages, timed phases, etc., entity modeling is entity-based. Each entity—a unit of data that exists as or is perceived as a single separate object—can be considered as representing a piece of information. All of the entities, which represent separate pieces of information in a solution process, together represent a problem domain. To this end, "entity modeling" refers to a way for an application developer, referred to as a solution builder or entity model builder herein, to define these pieces of information, set up relationships (e.g., an applicant may be associated with one or more job openings), specify rules to define constraints (e.g., an applicant must have a minimum of one year work experience), put in processes that define behaviors (e.g., notify a hiring manager when an applicant who is a current employee applies for a different position in the enterprise), add forms (e.g., a recommendation form that a hiring manager has to fill out), define work lists (e.g., queries for searching against entities, for instance, for searching positions based on how long each position has been vacant), and eventually build an application that end users can use for the particular solution process.

Such entities models can be characterized as visual models and the entities can be utilized (e.g., visually and rapidly via a user-friendly interface) to define various elements of an application (a computer-implemented solution), reducing the need for hand-coding and accelerating the development process. This is referred to as low-code application development.

Low-code application development is a new field in information technology and improves upon traditional application development by, for instance, significantly reducing the length of time needed to create and deploy a solution as well as the knowledge and/or skill set needed to code a solution, allowing even non-coders to provide their input while a solution is being developed in the process. Taking a compositional (and visually-driven) approach, embodiments of a low-code application development platform may comprise elements that particularly define an entity modeling system and items (e.g., documents, forms, cases, process instances, etc.) that are created by users. An item in this disclosure may refer to a set of elements that have been assembled into an object. The elements and items, which can be stored in a data stored embodied on a networked server machine, can be partitioned into separately managed solutions.

Unlike traditional application development platforms, users of the entity modeling system seamlessly integrated into and running on the low-code application development platform do not need to be application developers in the traditional sense—they do not need to have knowledge or experience in manual coding and can be application subject matter experts, rather than specialized IT personnel or programmers. For instance, a hiring manager working for an enterprise can develop an HR application for filtering job applicants; an insurance agent can develop a risk analysis application for determining insurance premiums, etc.

Embodiments of an entity modeling system disclosed herein include a user interface and entities that are managed by the same system. Since entities can be defined as part of a computer-implemented process solution, the need to define them using another software tool is advantageously eliminated. Such a process solution has a technical effort of aggregating all of the bits and pieces of information that are needed to solve a particular problem into a single package, unit, or thing that can be manipulated as a single, concrete entity. Examples of process solutions include, but are not limited to: claims processing applications, loan origination applications, employee on-boarding applications, and so on.

When a computer-implemented process solution is deployed, the low-code application development platform can automatically create/update the database structure needed for the entities defined (via the entity modeling system) in that process solution. This integrated approach to entity modeling is compositional in that a user of the entity modeling system (e.g., a solution builder) can compose or otherwise create an entity by adding/removing entity building blocks (which are special elements of the underlying low-code application development platform) of various kinds. By bringing entities and entity building blocks into the low-code application development platform on which the entity modeling system operates, the low-code application development platform can take over responsibility for when item data (later created by end users of the process solution) is fetched and stored. This eliminates a significant source of errors.

Additionally, any changes to the entity model can be accurately, timely, and correctly reflected in other models such as form models, case models, etc. running on the low-code application development platform. Because an entity model can capture entities with their relationships, a solution builder (who can be a non-coder) can navigate (e.g., visually) and interact directly with entity properties and relations via the user interface of the entity modeling system, significantly reducing the complexity of use.

As a non-limiting example, accessing a property via an eXtensible Markup Language (XML) message can be reduced from this:

GetMortgagesObjectOutput/GetMortgagesObjectResponse/tuple/old/Mortgage/amount/text( )>1000000 to this:

mortgage.amount>1000000

Furthermore, because the relationships are available in the entity model, a form can be utilized to fetch all the required data in a single request. This optimizes performance of browser/server interaction without requiring coding in an application server.

Advantageously, other systems such as case management systems can leverage entities created using the entity modeling system to capture the case data. This enables other systems to maintain relationships with the entities. For example, the form modeling system can automatically enforce validation rules, calculated values, and property interactions JavaScript on the client based on the underlying entity's rules.

In this way, the entity modeling system can provide a central place where entities can be composed or otherwise created by adding/deleting entity building blocks (which can include process logic such as declarative rules and user experience such as forms, layouts, actions, etc.) as appropriate, and the entities thus composed can then be used and reused seamlessly by other systems.

In embodiments disclosed herein, an entity building block refers to a container or unit of information containing a piece of code that defines a fundamental nature or characteristic of an entity, that specifies how users interact with an entity, and/or that provides a specific functionality, etc.

There are many ways to create/modify entity building blocks. In embodiments disclosed herein, entity building blocks are special types of elements in an application architecture based on which the low-code application development platform described above is built. An entity building block, therefore, can be created by implementing a special element class which can be derived from a base element class. This base element class implements the basic methods to manage an element's definition along with element type specific methods to implement the element's functionality. In some embodiments, this may be the only class that need be implemented for some types of elements.

As a non-limiting example, a user may create an entity building block by first starting an application particularly configured for defining entity building blocks. The user may instantiate a specific entity building block from a special element class. The entity building block thus instantiated is an instance of a particular element type from the special element class. Examples of special element classes suitable for implementing entity building blocks are provided below.

For the sake of discussion, and not of limitation, entity building blocks may be arbitrarily categorized as structural, decorative, and functional. "Structural" building blocks may define the fundamental nature of an entity. These may include Property, Relation, Rule, etc. "Decorative" building blocks may specify how users interact with entities. These may include Worklist, Form, Layout, Action Bar, etc. "Functional" building blocks may add "chunks" of functionality to an entity. These may include Security, History, Title, Tracking, etc. Accordingly, the behavior of an entity can be shaped by structural building blocks, the look and feel of an entity can be shaped by decorative building blocks, and the functionality of an entity can be shaped by functional building blocks. Overtime, entity building blocks can be modified and/or extended. Likewise, element types can be created and/or updated in the underlying application development platform.

Once an entity building block is created, it may be registered with the entity modeling system. Any suitable registration method may be used. In some cases, this may entail updating a user interface of the entity modeling system so the newly created entity building block can be displayed in a section of the user interface of the entity modeling system. This allows for an open-ended, very flexible way to add/update/expand entity building blocks. In some embodiments, entity building blocks can be persisted/stored in a data store accessible by the entity modeling system, as shown in FIG. 1.

FIG. 1 depicts a diagrammatic representation of an example of entity modeling system 100. In some embodiments, entity modeling system 100 may operate on an application development platform embodied on one or more server machines such as server computer 1216 described with reference to FIG. 12. The application development platform, integrated with entity modeling system 100, may be referred to as a low-code application development platform. In some embodiments, entity modeling system 100 is configured to operate in conjunction with enterprise systems at the backend, for instance, a database management system that manages database 1218 described below with reference to FIG. 12.

In some embodiments, entity modeling system 100 may include at least one processor, a data store storing a plurality of entity building blocks, at least one non-transitory computer-readable medium, and stored instructions embodied on the at least one non-transitory computer-readable medium and translatable by the at least one processor to provide entity model designer tool 110. Entity model designer tool 110 may have a plurality of components including graphical user interface 150 and entity composition function 160. In some embodiments, a user of entity modeling system 100 (e.g., a solution builder, subject matter expert, etc.) may access entity composition function 160 of entity model designer tool 110 via graphical user interface 150 running on a client device such as builder computer 1215 described with reference to FIG. 12. In some embodiments, entity modeling system 100 may be configured for building computer-implemented, entity-based process solutions 120*a* . . . 120*n* for many different real world problems in a networked enterprise computing environment such as enterprise computing environment 1200 described with reference to FIG. 12.

Each entity-based process solution 120*a* . . . 120*n* may be defined by a set of entities and their relations, for instance, entities 130 for process solution 120*a*, entities 190 for process solution 120*n*, etc. For the sake of brevity, the relations are not separately shown in FIG. 1. Those skilled in the art appreciate that each entity in a process solution may be related or otherwise associated with one or more entities in the same process solution. For example, as illustrated in FIG. 1, entity 131 may be associated with one or more entities and their relationships may be characterized by child entity hierarchy 235. Notice here, however, entity 131 is composed in and managed by entity modeling system 100 in the context of process solution 120a. Furthermore, entity 131 is composed of a plurality of entity building blocks (EBB 141, EBB 143, . . . , EBB 149). These features are further described below.

Figure 2:
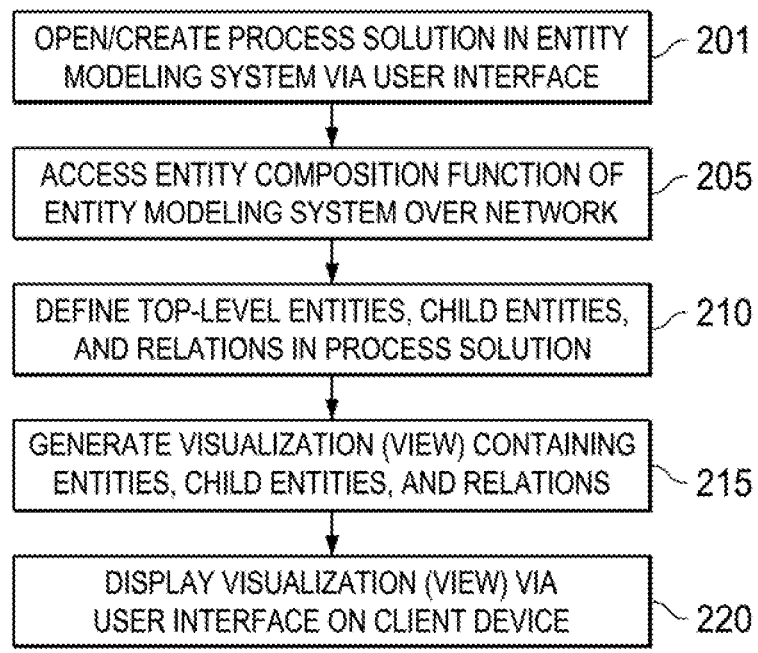
FIG. 2 is a flow chart illustrating an example method for composing an entity in a process solution according to some embodiments.

An example method for composing an entity in a computer-implemented process solution is illustrated in FIG. 2. In some embodiments, a user (e.g., a solution builder) may open or create a process solution (e.g., process solution 120a shown in FIG. 1) in an entity modeling system 100 (e.g., entity modeling system 100 shown in FIG. 1) (201). The user may access an entity composition function (e.g., entity composition function 260 of entity model designer tool 110 shown in FIG. 1) via a user interface (e.g., graphical user interface 150 shown in FIG. 1) running on a client device (205). The user can use the entity model designer tool to define, in the process solution, each top-level entity, its child entities, and relations to other entities (210). Taking an entity-based, or entity-centric, approach, the user interface is updated essentially instantaneously corresponding to user actions/interactions, providing a visualization (e.g., a view on a screen of the client device) for each entity under composition. This visualization or view may include one or more child entity hierarchies that are specific to the entity.

Figure 3:
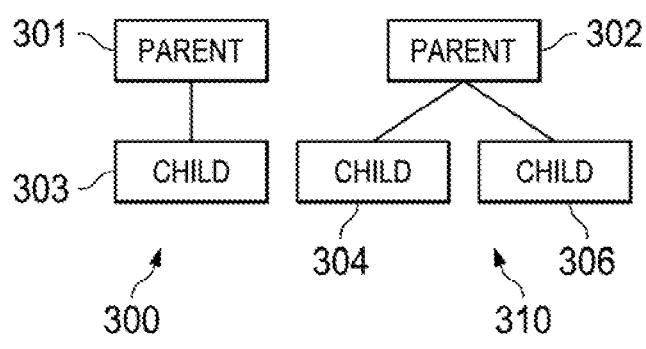
FIG. 3 depicts a diagrammatic representation of child entity hierarchies according to some embodiments.

FIG. 3 depicts a diagrammatic representation of child entity hierarchies 300, 310 according to some embodiments. In this example, parent entity 301 (which is a top-level entity) in child entity hierarchy 300 has a single child entity 303 and parent entity 302 in child entity hierarchy 320 has child entities 304, 306. Relations between these entities can be defined visually via the user interface, utilizing pre-defined entity building blocks from an integrated low-code application development platform. Entity building blocks are further described below.

As a non-limiting example, referring to FIG. 1, responsive to an instruction from a user to model an entity, entity model designer tool 110 may generate a visualization (referred to hereinafter as a view) containing a name of the entity and visual components of entity composition function 160 and display the view on graphical user interface 150. An example of such a view is illustrated in FIG. 4.

Figure 4:
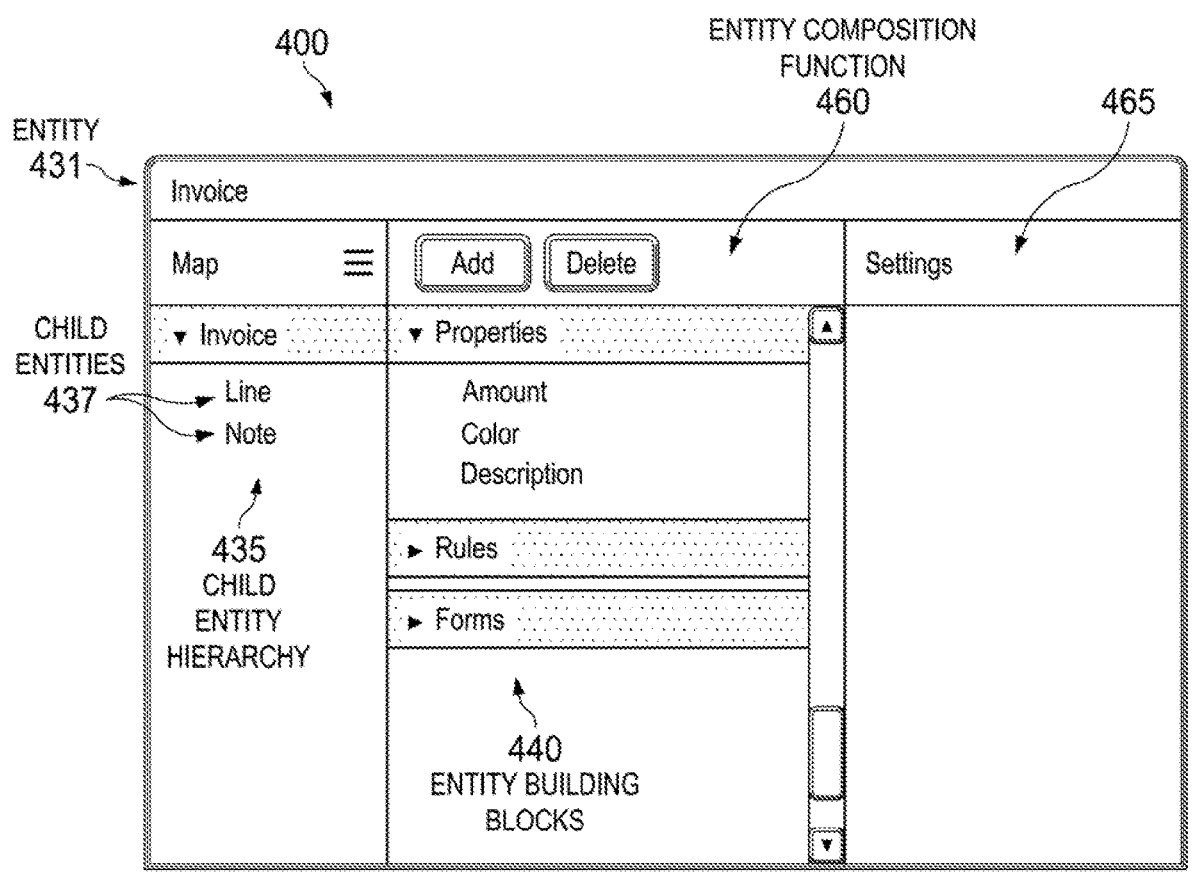
FIG. 4 depicts a diagrammatic representation of a visualization or view of entity composition via a user interface of an entity modeling system utilizing pre-defined entity building blocks from an integrated low-code application development platform according to some embodiments.

As illustrated in FIG. 4, first view 400 may include a name for entity 431 (which is "Invoice" in the example illustrated) and visual components of entity composition function 460. In the example of FIG. 4, visual components of entity composition function 460 include the "Add" and "Delete" buttons corresponding to the functions of entity composition function 460. Such visual components allow a user to quickly and easily add/delete entity building blocks relative to entity 431 by interacting with user interface elements such as icons, menus, scroll bar(s), etc. displayed on first view 400, instead of manual coding.

In embodiments disclosed herein, an entity may include child entities. Child entities are wholly owned components, which together with the top-most entity, define a larger entity (e.g., entity 131 shown in FIG. 1 or entity 431 shown in FIG. 4). If an entity includes any child entities, the systems generates a view with a section or panel that can expand to display one or more child entities. In the example of FIG. 4, child entity hierarchy 435 for entity 431 is displayed under a section "Map" in first view 400, showing that entity "Invoice" 431 has two child entities "Line" and "Note" 437. A menu in this panel enables adding and removing any of child entities 437 from child entity hierarchy 435 (and hence terminating their relations with entity 431).

In some embodiments, first view 400 may further include a section or panel for visualizing a collection of pre-defined, registered entity building blocks 440, based on which entity 431 is composed. As described above, a user can quickly and easily add and remove one or more entity building blocks via visual components of entity composition function 460 which, in this example, are implemented as a set of toolbar functions such as an add function for adding entity building block(s) to an entity, a delete function for deleting or removing entity building block(s) from an entity, etc. When an entity building block is selected, its configuration form may be displayed in a separate section or panel of first view 400, for instance, in settings section 465. In some cases, when a group of entity building blocks is selected, first view 400 may present options for the group as a whole in settings section 465.

In some embodiments, settings for entity building block(s) selected via entity composition function 460 in settings section 465 of first view 400. When no entity building block is selected, settings for the entity under composition may be displayed as a whole in settings section 465 of first view 400. In some embodiments, settings section 465 of first view 400 may be configured for displaying entity building block settings in complex forms. Even so, some entity building blocks may require more space than is available in settings section 465. For such entity building blocks, a summary may be presented in settings section 465 and a button/link provided such that information about a particular entity building block can be presented in a separate window.

Figure 5:
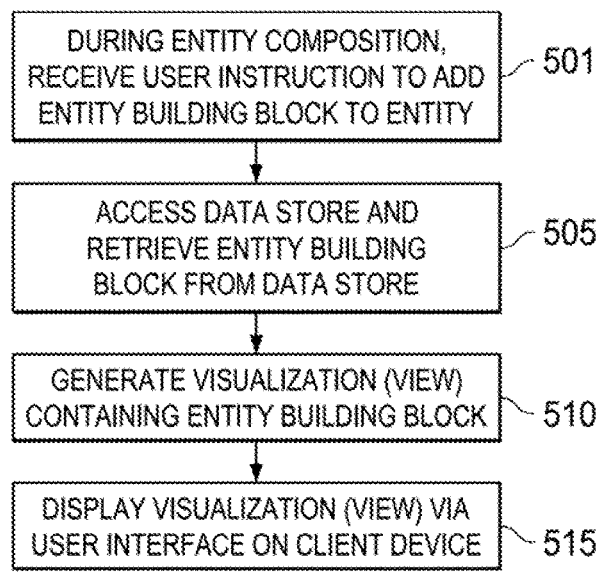
FIG. 5 is a flow chart illustrating an example method for adding one or more entity building blocks to an entity during entity composition according to some embodiments.

Some entity building blocks can be added to an entity many times, others can only be added once. FIG. 5 is a flow chart illustrating an example method for adding one or more entity building blocks to an entity during entity composition. In some embodiments, the system may, via a user interface running on a client device, receive an indication (e.g., a user selecting the add function of entity composition function 460 shown in FIG. 4) that an entity building block is to be added to an entity under composition (501). Responsive to user interaction with the entity model designer tool (e.g., entity model designer tool 110 of entity modeling system 100 shown in FIG. 1), the system may access a data store where entity building blocks are stored (e.g., data store 170 storing entity building blocks 180, as shown in FIG. 1) and retrieve the desired entity building block from the data store (505). As described above, the data store may store pre-defined entity building blocks that are registered with the system. The system may generate a view that includes the desired entity building block (510) and display the view via the user interface on the client device (515).

Figure 6:
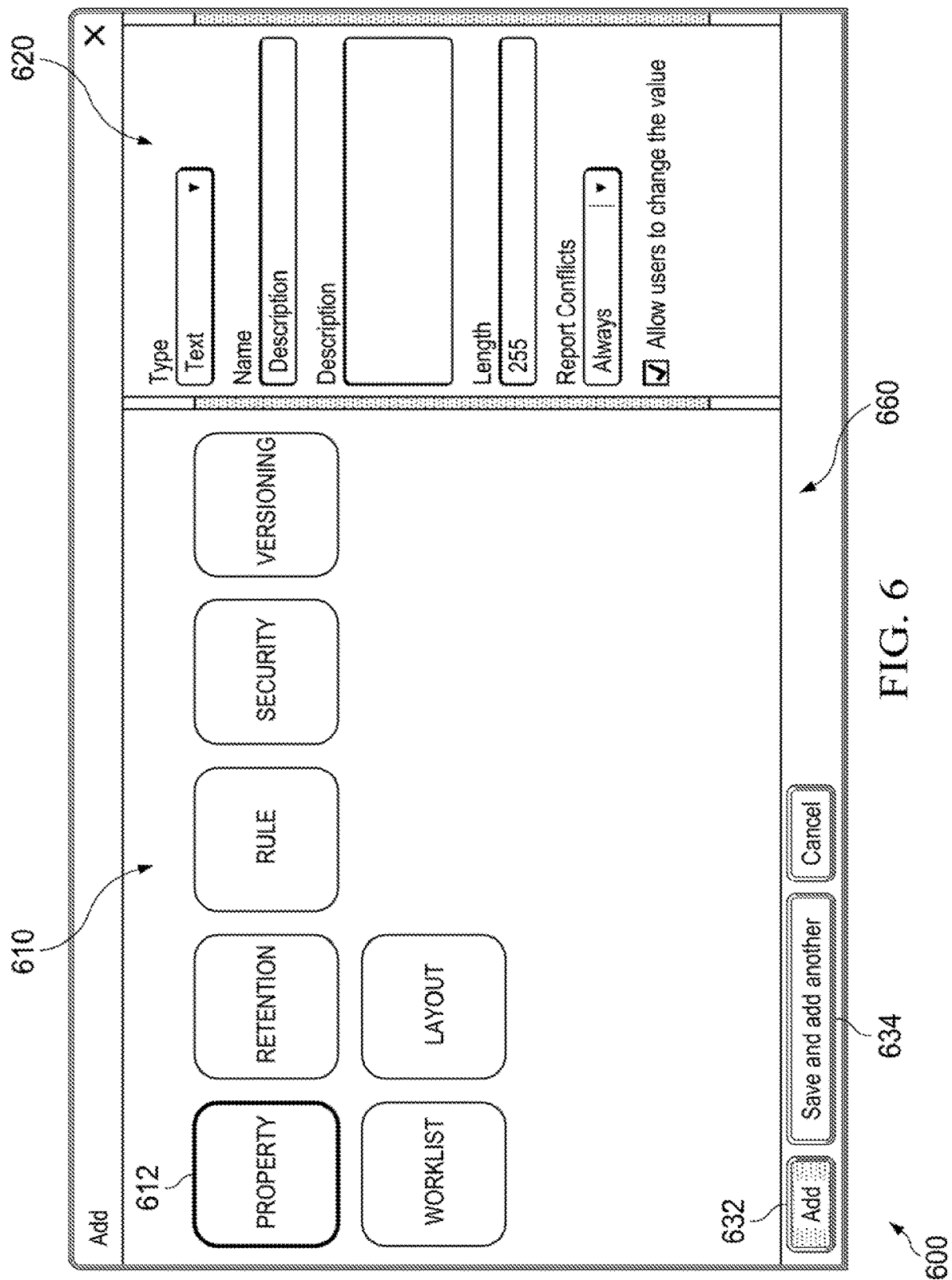
FIG. 6 depicts a diagrammatic representation of a visualization or view of entity composition via a user interface of an entity modeling system utilizing pre-defined entity building blocks from an integrated low-code application development platform according to some embodiments.

FIG. 6 depicts a diagrammatic representation of a visualization or view of entity composition via a user interface of an entity modeling system in which pre-defined, registered entity building blocks can be retrieved from an integrated low-code application development platform and added to an entity under composition according to some embodiments. In the example of FIG. 6, this view is referred to as Add Building Block dialog 600.

As illustrated in FIG. 6, while using an entity composition function (e.g., entity composition function 460), a user can access Add Building Block dialog 600 and choose from building block collection 610 a type of entity building block they wish to add to an entity (e.g., entity 431 shown in FIG. 4). Responsive to an indication that the user wishes to add a particular type of entity building block (e.g., "Property"

entity building block 612), the system may instantaneously display configuration form 620 that corresponds to the particular type of entity building block. While entity building blocks are pre-defined and persisted at the backend, some entity building block settings (e.g., parameter values for "Type," "Name," "Description," etc.) are user-configurable via configuration form 620 such that a configured entity building block would be particularly suited for the entity under composition. Additional settings may be presented based on the building block type. Some building block settings may be immutable. These may also be displayed in configuration form 420 at the time an entity building block is added to an entity.

In the example of FIG. 6, when the user is done with configuring entity building block 612, the user may invoke add function 632 (e.g., by clicking on a corresponding "Add" button shown in navigation bar 660) to add entity building block 612 to the entity (e.g., entity 431 shown in FIG. 4) and close Add Building Block dialog 600. In response, the system may automatically extend the entity to include settings of entity building block 612. The user may wish to continue adding another entity building block. In this case, the user may invoke a repeat function (e.g., by clicking on "Save and add another" button 634 shown in Add Building Block dialog 600) to add another entity building block without closing Add Building Block dialog 600, making it easier to add many entity building blocks quickly. Each time the add function (which is part of the entity composition function described above) is invoked (either through button 632 or button 634), the system automatically extends the entity under composition to include the entity building block and its associated settings.

As described above, entity building blocks are the bits and pieces of information that a solution builder can use to assemble their entities. Each entity building block adds something to the entity that it is a part of. Adding building block to an entity can extend any of the following aspects of the entity, including at least one of a property, a permission, an action, a behavior, or a resource to the entity. These are further described below.

Properties—most entity building blocks can add properties to an entity. One example is the Property building block that adds one property. Another example is the Assignee building block which adds several properties: assignee, assigneeType, notifyAssignee, etc. This entity building block adds the concept of responsibility to an entity. By assigning an instance to someone, that person is then responsible for taking the required action.

Actions—many entity building blocks can add actions to an entity. Actions may be presented to a participant (the presentation is controlled by an A Presentation, which is itself an entity building block that can be added to an entity). Actions may also be invoked programmatically. For example, Status building block adds the actions: Start, Complete, Hold, Ignore, Restart and Resume (not all of which are available at any given time. Such an action added to an entity appears in an end user's interface to be triggered interactively. With Status building block one can instantly add the concept to status (or state) to an entity. Typically, performing actions on an instance will affect in a change to the status of that instance.

Permissions—many entity building blocks can add permissions to an entity. These permissions can then be granted to roles to control access to the functionality provided by the Permission building block. For example, permissions may be used in Security Policies (which are also entity building blocks, see below), to control who can do what to instances of the entity. For example, the Versioning building block adds the permissions CheckOut and Manage Versions.

Behavior—many entity building blocks can alter the behavior of an entity. For example, the Retention building block can prevent an item from being deleted if it has not yet expired. A Behavior building block adds event-based logic that is triggered when a specific event takes place relative to an entity. Example events may include Access, Create, Delete, ChangeProperty, and so on.

APIs—some entity building blocks can extend the programmatic operations available on an entity. For example, the File building block adds a resource to the item resource normally used to manipulate items. As another example, adding REST resources can extend the programmatic interface of an entity.

Layout Panels—some entity building blocks can enable the use of additional layout panels in an entity's layouts. For example, if an entity object includes a child entity that includes the Project, Status, Assignee, Supporting Items and Deadline building blocks, the entity object's layout can include the Task Management panel.

In some embodiments, entity building blocks in an entity modeling system can be arbitrarily divided into broad building block categories/types that can be added to an entity. For example, entity building blocks may be sorted into the following types:

Structural building blocks that define the fundamental nature of an entity (e.g., Property, Relation, Rule, etc.);

Functional building blocks that add "chunks" of functionality to an entity (e.g., Security, History, Title, Tracking, etc.); and Decorative building blocks that specify how users can interact with entities (e.g., Worklist, Form, Layout, Action Bar, etc.).

To understand the capabilities of entity modeling, a process solution builder should understand the entity building blocks that can be used to construct an entity. Below is a non-limiting list of example entity building blocks.

Structural building blocks:
Properties—adds the ability to define structured groups of properties.
Relationships—specify how this entity relates to other entities.
Rules—adds the ability to add rules to an entity to specify process logic or to create custom actions.

Functional building blocks:
History—adds the ability to track changes to instances of entities in a history log (an audit trail). For example, it may keep track of when instances are created and when these are last modified and by whom.
Security Policies—adds the ability to define security policies that control access to instances of an entity.
Title—adds a Title that can be used to identify instances of the entity. Having a title on an entity enhances the readability of history linkable where used entries, etc.
Tracking—adds date/time created and last modified and user who created/last modified instances of the entity.

Decorative building blocks:
Action Presentations—specifies a presentation for the entity's actions. Multiple action presentations may be defined for use in different layouts or for use by different personas.
Forms—specifies a presentation for the entity's properties. An Entity's form may include information from parent, child or other related entities. Multiple forms may be defined for use in different layouts or for use by different personas.

Layouts—specifies an overall presentation of an instance of the entity. Multiple layouts may be defined for use by different personas or different states of an instance of the entity.

Worklists—adds the ability for end users to access lists of instances of the entity. Any number of worklists may be added to an entity and access to worklists can be controlled by security.

As described above, some entity building blocks (e.g., decorative building blocks) the can be added to an entity definition multiple times (and are therefore presented under a group card in one embodiment). Most entity building blocks can only be added once (for example, an entity either has History or it does not). In one embodiment, those that can be added multiple times are presented as a stacked card that can be expanded to see the individual building blocks. In one embodiment, the first time a given type of entity build block is added, the group card is automatically added. Deleting the last instance of a grouped building block deletes the group card.

Structural and function building blocks can alter the basic structure of an entity. For example, adding, removing and, in some cases, changing the settings on these entity building blocks can change underlying database representation of the entity. For the most part, this is neither visible nor important to the solution builder. However, a builder is not permitted to add, remove or alter these entity building blocks in external entities (see below).

The definitions for some entity building blocks (e.g., Security Policies, Action Presentations, Forms, Layouts, Worklists, etc.) can be large and complex. Adding such a large and complex entity building block may entail opening a new window or tab in the entity model designer tool, as described above.

Some entity building blocks have additional functionality when used in conjunction with other entity building blocks. For example, when the Status and Assign building blocks are used together, additional security permissions are exposed to enable only the Assignee to change the Status.

Embodiments of an entity modeling system disclosed herein can streamline application development in various dimensions:

Introduce an intuitive way of modeling a problem domain that is close to how an application developer (e.g., a process solution builder) conceptually thinks about it;

Guide the application developer as much as possible when navigating through the domain model to express process logic;

Provide an efficient way of adding behavior to an application (e.g., a process solution) by enabling the application developer to select and configure functional modules (e.g., entity building blocks).

These dimensions will be explained in the context of an example problem domain as follows.

Example Problem Domain

Managing leave balances of employees is something almost any company has to deal with. This includes many activities, for example:

Employees submitting new leave requests;
Managers approving or rejecting leave requests of their direct reports;
Employees inspecting the status of their leave requests;
Employees inspecting their leave balances;
Employees canceling their leave requests (before or after it has been approved);
Keeping track of how many days of leave individual employees are granted on a yearly basis.

Form-Based Applications

There are a lot of applications that are mainly about data entry, data visualization, and data manipulation. End users interact with such applications through work lists that list items matching various filter conditions and forms through which new information can be entered or existing information can be changed. In addition, the application developer may choose to define actions (buttons) that can be triggered by end users to change the data that's stored in the system.

To this end, the following represents example use cases of the example application (i.e., a particular process solution for the above example problem domain):

Employees submitting new leave requests
Managers approving or rejecting leave requests of their direct reports
Employees inspecting the status of their leave requests The above use cases can be covered by developing the following forms and work lists:

A form to submit a new leave request
A work list for a manager to list leave requests awaiting approval
A form to approve or reject a single leave request
A work list for an employee to list their leave requests
A form to inspect the status of a single leave request Developing the above parts of the application could either start by modeling the entities that are involved in the use cases or by developing the forms through which the end users perform the listed actions. In the discussion below, it is assumed that application developers start with modeling the entities. If they would start with developing the forms, the system could still automatically (or with very few inputs from the application developer) create the underlying entities such that the end result of both approaches is (more or less) the same.

Modeling Entities

Every process solution defines entities such as employees, leave requests, orders, claimants, accounts, patients, cars, goods, etc. These entities have a structure and often relate to one another. The collection of entities in a process solution is called the process solution's domain. An application developer defines their process solution's domain using the entity model designer tool described above to add entities to their process solution (which is referred to as a project in an application development environment). The modeling environment frees the application developer to focus on their entities without worrying about how the entities are stored/accessed at the backend.

The entity model designer tool is compositional in various dimensions. Below first explains the dimension of composing the structure of entities in terms of properties, relationships and rules.

Start with Properties

Properties are the pieces of information associated with the entities (other systems may call these attributes or fields). Suppose the example application includes the entities Employee and Leave Request. The application developer starts by thinking about what they need to know about each of these entities. They break this information down into the set of properties they need for each entity. Each property has a name, a descriptive name and a data type that specifies the type of information it holds (text, integer, money, date, etc.).

As a non-limiting example, for Employees, the following properties may be needed:

Employee number—text, 6 characters
UserId—the user login Id for the employee, this is needed to find a user's employee record, text, 30 characters
Name—the name of the employee, text, 30 characters Remaining leave—the number of leave days an employee has remaining—an integer, minimum 0 and maximum 30

For Leave Requests, the following properties may be needed:

Start date—the first day the employee will not be at work, this is a date

End date—the last day the employee will not be at work, this is a date

Status—an enumeration with the possible values: Submitted, Approved and Rejected Add Relationships Of course, one would need to know who submitted a leave request leave request. Further, one would need to know the employee's manager who has to approve the leave request. This type of information is managed by creating relationships between the entities. Properly defining relationships can be difficult and may require some training to understand the best practices and how to avoid common anti-patterns. For this example, the following relationships are defined:

Requestor—from Leave Request to Employee—cardinality is 1 . . . 1, this identifies which employee submitted the leave Manager—from Employee to Employee with cardinality 0 . . . 1 to identify an employee's manager Below are listed additional relationships that could be defined. This example application does not need these relationships. However, an application developer may choose to add them for future use, or choose to omit them and add them later when they are needed.

Reports—from Employee to Employee with cardinality is 0 . . . N, which if the employee is a manager, identifies their direct reports. This would work with the Manager relationship to create a bidirectional relationship.

Leave Requests—from Employee to Leave Request with cardinality 0 . . . N which lists an employee's leave requests. This would work with the Requestor relationship to create a bidirectional relationship.

Add Rules

An application developer can add rules to their entities for many reasons. In this example application, rules are added to trigger automatic actions and to constraint on what users can do.

Figure 7:
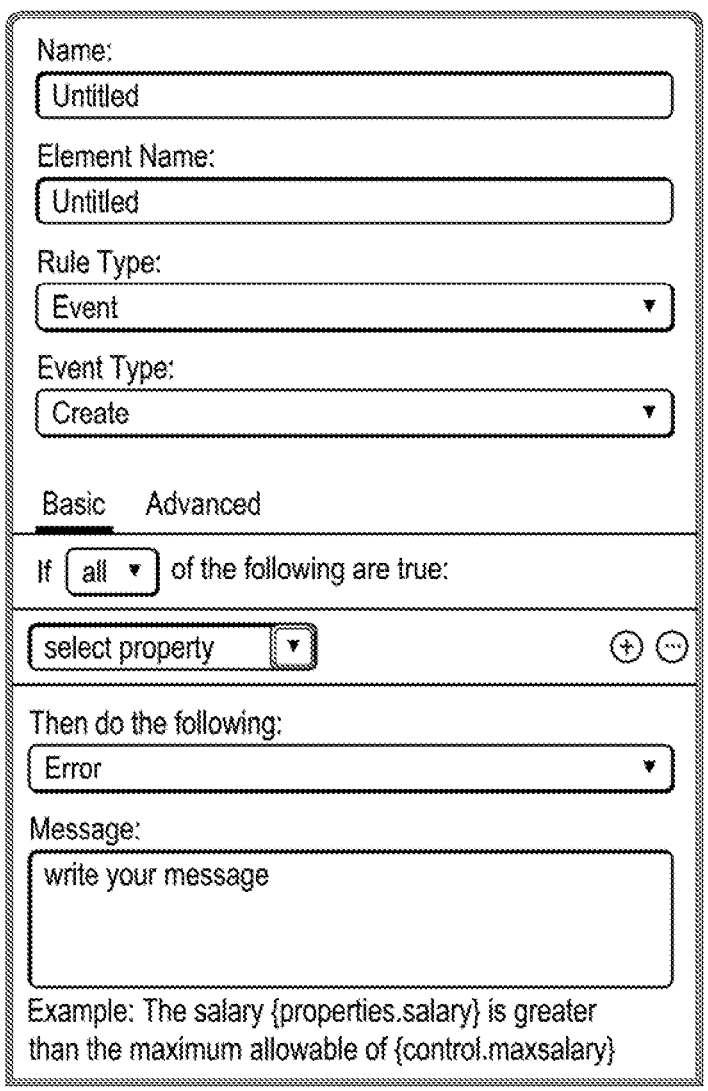
FIG. 7 depicts a diagrammatic representation of an example rule modeler for adding rules to entities according to some embodiments.

FIG. 7 depicts a diagrammatic representation of an example user interface of rule modeler 700 for adding rules to entities. As illustrated in FIG. 7, a user can utilize rule modeler 700 to name a rule and specify how the rule is to be triggered and/or applied.

Rules can be triggered based on conditions, events or user actions. Suppose a rule is to automatically set the Requestor when a Leave Request is created. In this case, this rule is triggered by the Create event—this event occurs when the user clicks the Create button (after filling in the create form if the entity has a create form). This is a fairly tricky rule: on create set requestor=doQuery("Employee", "userId=user.userId") [0]. This sets the Requestor relation to reference the first (and only) employee item with the current user's userId.

Examples of events that can trigger a rule include Create, Update, and Delete. The Update event is rarely needed—most of the time such a rule can be written as properties in the rule's condition.

Another rule would warn a user if they were entering a leave request that starts before the current date: warn "Leave requested starts in the past" if startDate<now.

A more complex rule would warn a user or manager if any other team members were taking leave requests at the same time: warn "Other employees are on leave during this time" if leaves=doQuery("Leave Request", "requestor.manager.userId=user.manager.userId"); count (leaves where (leaves.start>=start && leaves.start<=end) (leaves.end<=end & leaves.end>=start))>0.

Rules can also be used to add custom user actions to an entity. Actions appear in two places: in work list results and in item layout pages (when an item is "opened"). When actions appear in work list results, the user can select any number of result items and click an action to apply that action to all selected items. Additionally, custom actions can optionally be added to an entity as rules with a rule type "User Action."

Figure 8:
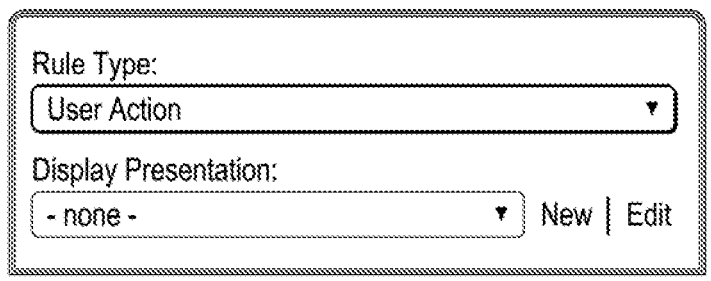
FIG. 8 depicts a diagrammatic representation of an example rule type for optionally asking an end user to perform certain action according to some embodiments.

For the example rule (which automatically sets the Requestor when a Leave Request is created), Approve and Reject actions can be added to enable managers (who are the end users of the application/solution under development) to approve and reject leave requests more quickly. This can be done by choosing (e.g., via rule modeler 700) the "User Action" rule type and presenting an input field in one of the entity's forms in the application/solution so that an end user can input parameters for the action. Such presentation can be configured via "Display Presentation" under the "User Action" rule type, as exemplified in FIG. 8.

Suppose an Approve rule is added with type User Action and with no form. This rule can be configured, as a non-limiting example, as a Set action where the status property value is set to Approved. The Reject action can be added in a similar way, except it sets status to Rejected. Typically, performing actions on an entity (an instance of a special application element) will affect in a change to the status of that instance. For example, when approving a leave request, the status of that leave request changes from 'Waiting for approval' to 'Approved'.

Because these actions are meant to be enabled when an end user is looking at leave request for one of their direct reports, a condition is added to these rules. If the condition is false, the actions will be disabled. The example condition used for this example is reports=doQuery("Employees", "manager.userId=user.userId"); requestor.userId in reports[ ].userId.

Decorate Entities

Once the entities are defined, they can be decorated to specify how they interact with end users of the application thus developed, including:

what do users see when they create new items (instances of entities)

what do users see when they update items how do users find items how can users perform actions on items This is the second dimension of composing entities, which is about "decorating" these with visualizations.

Develop Forms

In order for end users to interact with an application's entities, an application developer (e.g., a solution builder) can create forms that specify how an entity's properties are to be displayed. An entity may have a creation form that is presented to end users to fill when they create new items. An entity may have update forms that are presented when items are opened. A form contains any number of components, arranged however the application developer wishes. Most of the components on a form are properties of the entity. These can be presented as data entry fields where an end user can enter values.

From the entity model designer tool, an application developer can add forms to their entities, just like any other entity building block. A form designer or editor (a functional component of the underlying entity modeling system) can present a palette of forms that are accessible via the entity model designer tool.

Figure 9:
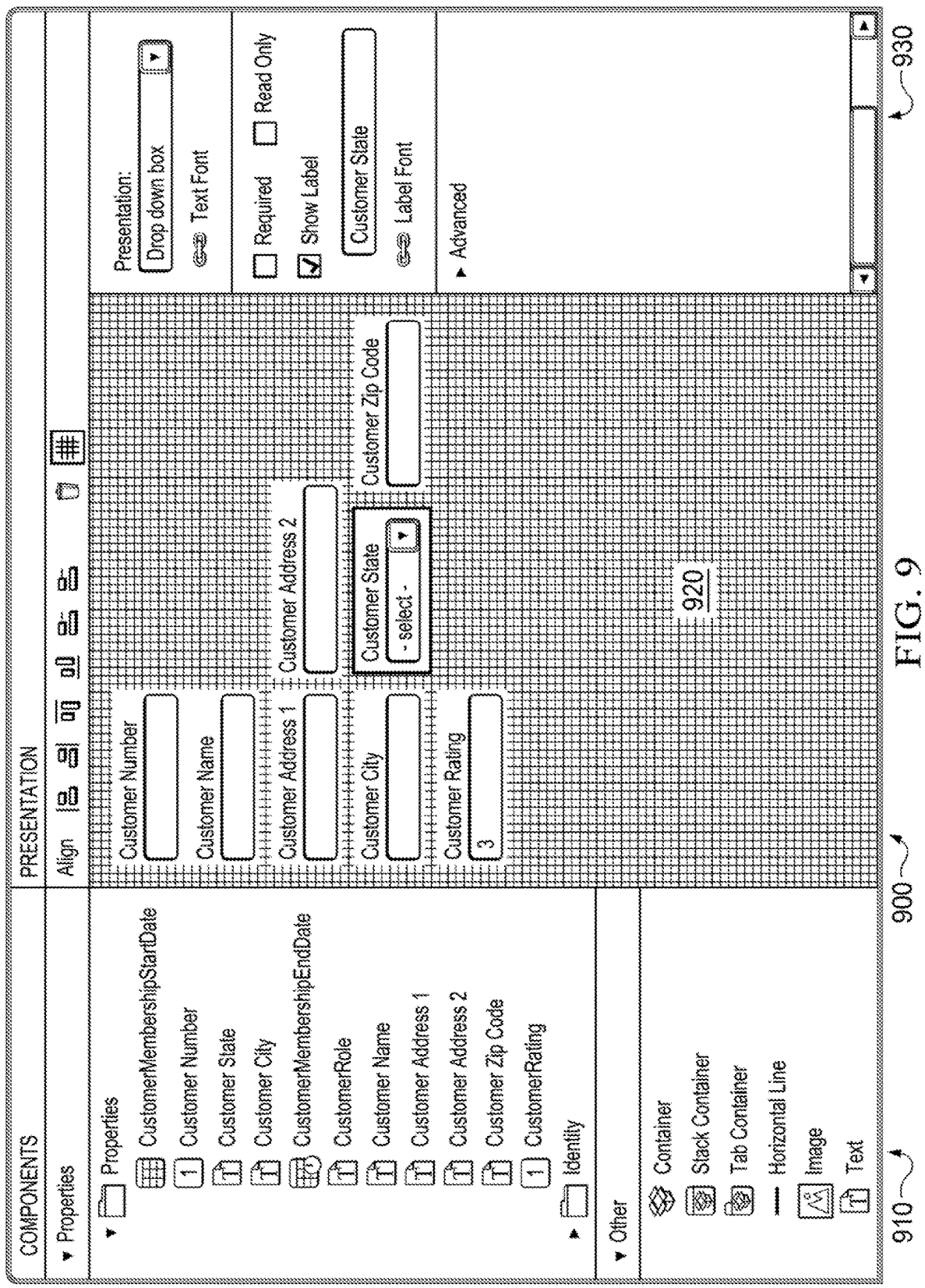
FIG. 9 depicts a diagrammatic representation of an example form editor illustrating reusability of entity building blocks according to some embodiments.

FIG. 9 depicts a diagrammatic representation of an example form editor illustrating how entity building blocks can be used and/or reused in a visual manner, for instance, by dragging and dropping an entity building block onto a design canvas. In this way, various visual presentations such as forms for an entity can be created quickly and easily.

Specifically, a user (e.g., an application developer) of form editor 900 can select from properties in an entity (which, in this case, represent "property" entity building blocks added to the entity), or navigate the entity's relationships to related entities via components palette 910 of form editor 900. In the example of FIG. 9, components palette 910 also includes various other controls/features that the user can use in their forms. The user can drag and drop representations of desired components (e.g., forms, controls, features, etc.) from components palette 910 onto form canvas 920 and drag and drop them around form canvas 920 to arrange them as desired. Each component is automatically presented using a standard control based on the component type. For example, when adding a property of the type "date" to the form, by default a date picker is added to the form.

When a form component is selected in form canvas 920, the user can specify how that property is to be presented using the controls in presentation control section 930. In some cases, the most significant can be the selection of a component's presentation (e.g., a Boolean property can be presented as a check box, as a pair of radio buttons, or as a drop list).

In addition to the entity's property model, form editor 900 can include other components that enable the application developer to group components into containers, including stacked and tabbed containers and to decorate their form with images, lines and static text.

The user can drop an entire relationship on form canvas 920. If it is a singular relationship (0 . . . 1), a form container component can be added and the user can choose which of the related entity's forms is to be displayed in the container. If it is a plural relationship (0 . . . N), a repeating item container can be added. This container lists the related items and provides user controls to add and remove related items. Alternatively, the user can choose to navigate through a singular (0 . . . 1) relationship and select individual properties from the related entity and drop them directly on to their canvas.

As described above, an entity may have any number of update forms for use in different contexts. The example application (which represents a process solution) described above is fairly straightforward, and has a single create form and update form for each of the entities thus modeled. A more complex application may present subsets of the information in an item to end users through dedicated forms designed for the various use cases in the application. In some cases, it can be about presenting information to an end user, whereas in other cases the end user is also expected to perform some action, as described above with reference to FIGS. 7-8.

Note that, unlike some systems, an entity's form described above can be a part of a view or page presented to an end user when an item is opened. For instance, a form can be displayed as a panel within an entity's item layout that may include many panels. A layout may display different aspects of the same entity by including multiple form panels each displaying a different form on that entity. In some cases, an item layout may include an Actions panel to enable a user to trigger actions on the item. A layout may also include other types of panels.

Following the above example, submitting a new leave request can be done through the user experience (UX) as specified by the application's home page. For example, when a Leave Request is created, its creation form can be displayed for an end user to enter the start date and end date of the requested leave (for the purpose of illustration, assume that employees can only request leave for a whole day or a sequence of whole days). This represents an example of a custom user action described above. The employee and manager can share the same form for inspecting a leave request—the Approve and Reject actions are automatically disabled when a user opens their own leave request.

How an end user opens the form for submitting a new leave request can be implemented in many ways. For example, in some embodiments, end users can create new "things" at any time by always showing the "Create" button at the top right corner of the home page. Whenever an end user clicks that button, the system checks which things this end user is allowed to create and lists all of these. Responsive to the user selecting one of these, the system will then open the creation form for it.

From Simple Forms to Complex Forms

With the graphical form designer (e.g., form editor 700) described above, application developers can develop forms of a low to moderate level of complexity. Whenever an application developer needs to develop forms with a level of complexity that goes beyond the capabilities of the graphical form designer, they are allowed to turn to pure HyperText Markup Language (HTML). By combining the HTML5 software development kit (SDK) to access platform capabilities with REST web services to retrieve and update items, application developers are able to build any form they want using embodiments of the entity modeling system disclosed herein.

Lists of Items

In addition to using forms, end users can query the system for items that require their attention. For example, managers can query the system to list all outstanding leave requests waiting for their approval. To cater this need, application developers can include so-called views or work lists in their application. For every work list, an application developer needs to specify which exact items must show up. This is done through a condition. In addition, the application developer needs to specify which pieces of information must be shown for the items that satisfy the condition. In many cases, a work lists shows properties of an entity on which a work list is defined. It may also show properties of related entities.

Figure 10:
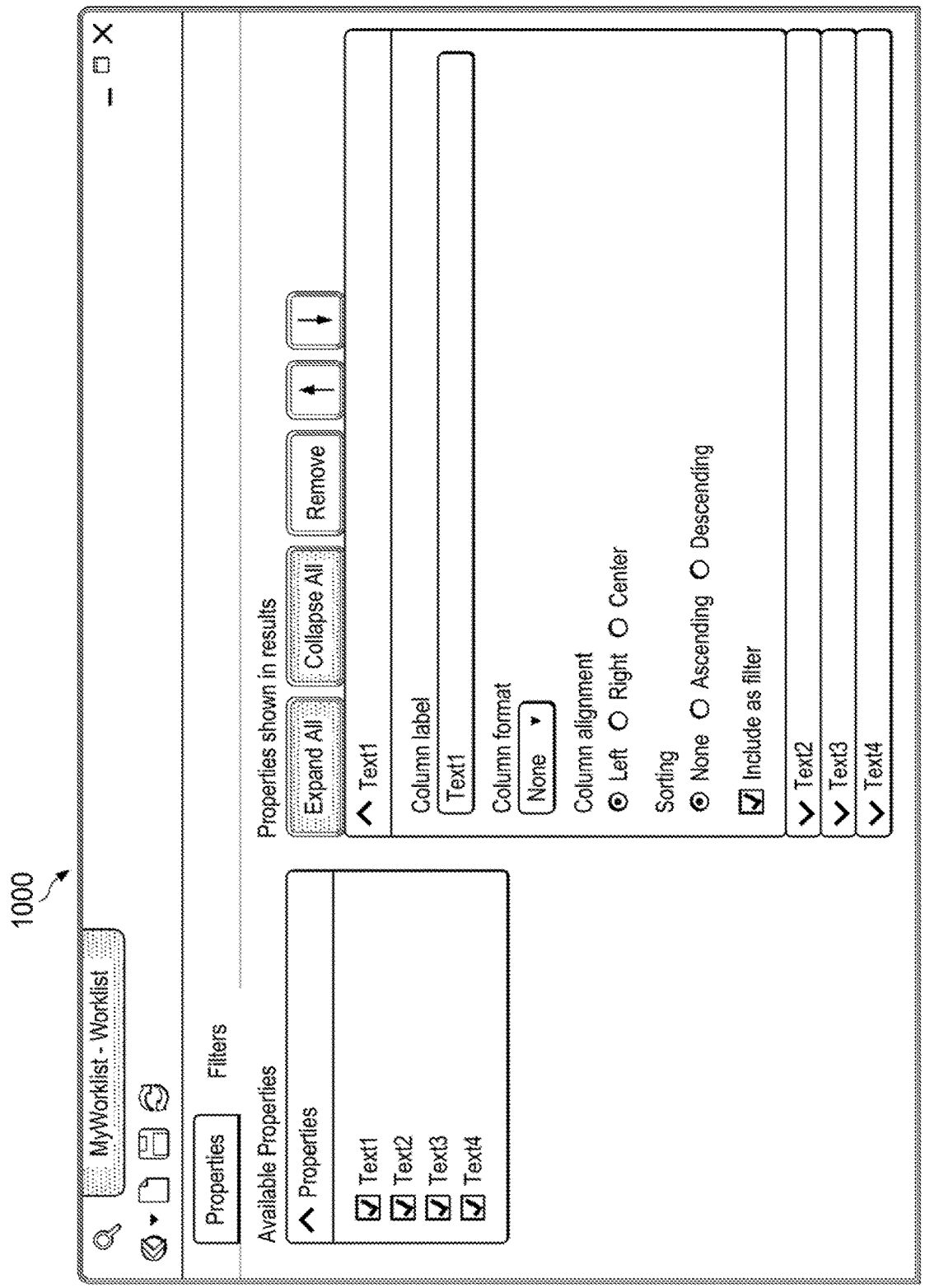
FIG. 10 depicts a diagrammatic representation of an example worklist showing entity building blocks of an entity on which the work list is defined according to some embodiments.

The use cases discussed above included two work lists. One for employees to see their own leave requests and a second for managers to list the leave requests awaiting approval. Both work lists are about showing leave requests. These work lists therefore naturally belong to Leave Request entity. The employee's work list shows the Start date, End date, and Status properties of the Leave Request. To select only leave requests for the current user, the work list includes the filter rule requestor.userId=user.userId., where user is one of the global elements available for expressing rules. The Manager's work list also includes the Start date, End date, and Status properties from the Leave Request. It also includes requestor.name (using the Requestor relationship to find the name of the employee requesting leave). To select only leave requests for the current user's direct reports, the work list includes the filter rule requestor.manager.userId=user.userId. This work list could also include the filter rule status=Submitted to only show the leave requests that are awaiting approval. In some embodiments, this rule may be omitted so a manager can see all of their direct report's leave requests. The work list can add Status to the filter form so the manager can choose to filter by Status if they wish. An example of worklist 1000 is shown in FIG. 10. An example of possible filters (e.g., Customer Number, Customer Zip Code, and Customer Name) 1100 is shown in FIG. 11.

Home Pages

Once an application developer has created forms and work lists, these can be displayed to end users via "home" pages. A home page can be a form which is split up in various panes where each pane can be specified to show a form or work list. All home pages are registered in the system. End users can quickly switch between the various home pages that are available.

Integration with External Systems

An application can become more complex with information to be retrieved from or even stored in external systems. The fact that an application interacts with different system is not something that should be exposed to end users of the application. End users most likely only care about the fact that the information they enter in forms is stored in the right place, and can be retrieved or changed at a later moment in time, regardless of where that information is actually stored.

The same kind of reasoning also holds for the phase of developing an application. Although the developer may know which entities thus modeled are part of the application and which entities are defined in external systems, when developing the behavior of the application, the so-called external entities to a great extent behave in the entity modeling system disclosed herein just as if they were defined as part of the application. That is to say, the application developer does not need to care about how external entities are accessed. However, the application developer cannot change their structure. Still, application developers are able to create unidirectional relationships to external entities, develop forms that present a mixture of information taken from newly defined entities and from external entities, develop new forms on external entities, etc. For instance, in the above example, the company for which the leave request application is built may use a different system in which additional information about employees is stored. Furthermore, the information about the reporting hierarchy may be stored in a separate human resources (HR) system.

To enable the development of applications that interact with external systems, dedicated connectors are developed for each type of external system. Such connectors are referred to as External Information System (EIS) connectors. Such EIS connectors define how the data in those systems is structured and expose that structure as if the external system also contains entities. For every type of external system an application needs to interact with, the application developer needs to include an EIS connection in the application. However, the application may not require all the pieces of information that are exposed by the EIS connector. In every EIS connection, the application developer should specify which exact pieces of information are of relevance for the application.

Next to exposing data, EIS connectors also expose the actions available on the data in the external system. These actions may be available for use in other parts of the application. Again, for the application developer there is no distinction between actions from the external system or actions that are developed on the entities that are part of the application.

Some examples of external systems are:
Relational databases
SAP
SharePoint

By having EIS connectors for these products, application developers can build new applications which interact with applications running on these products.

Workflow-Based Applications

Another dimension of complexity could be that solving a specific problem requires multiple end users (possibly with different roles in a company) to perform certain actions. In many cases, these actions may be performed one after the other. That is to say, the completion of one activity may trigger another activity. As long as one specific activity is pending, this blocks the entire workflow from progressing. In these scenarios, human activities are often intertwined with system services.

Such sequences of actions can be specified in a so-called process model. The various human activities in such a process model can then be specified to be carried out by specific roles in the company. Performing such activities is often done through some form in which the end user can check the status of an item, provide additional information, initiate some other actions, or mark the activity as being completed.

Alternatively, a process can also be triggered as the result of some event that occurred. This could be specified in a rule on that particular entity. In the example application, submitting a new leave requests may trigger a process that takes care of informing the manager of the new leave requests, after which the manager can decide to approve or reject it. Once that is done, the process can progress and finally inform the employee who submitted the leave request about the approval (or rejection), e.g., by sending a text message to the employee's cell phone. Employees no longer need to manually check the status of their leave requests.

Similar to the form designer described above, an entity-aware process model designer can guide an application developer through a domain model when expressing process logic. This makes process modeling very intuitive for many audiences, reaching from non-technical consultants to core application developers.

The above is mainly about scenarios in which all activities are performed in a structured way. Other use cases may include activities performed in a much more dynamic (or ad-hoc) way.

Composing the Behavior of Entities

Another dimension of composing entities is through functional building blocks described above. Behavior can instantly be added to entities by selecting entity building blocks that are delivered as part of the application development platform. For every selected entity building block, an application developer then only needs to configure how exactly that feature must work for that particular entity. This compositional way of modeling process solutions can significantly reduce the time-to-value, because many pieces of functionality are available from the application development platform and only need to be configured, instead of (re) engineered over and over again. In addition, the chance of introducing errors in those areas is much less, because they come complete and pre-tested.

Over time, more and more entity building blocks can become available. For example, a Note building block may be added to an entity to enable end users to add an arbitrary number of notes to instances of that entity. In the example application described above, a number of entity building blocks may be used:

>   History building block can keep track of the history of leave requests, e.g., when they are submitted and approved.
>
>   Assignee building block can automatically assign leave requests to the right manager immediately after it has been submitted. The Assignee behavior could then be configured in such a way that the manager receives an email notification whenever a new leave request has been submitted by one of her/his direct reports.
>
>   Note building block to the Leave Request entity can provide managers and employees a way to post notes on leave requests.

Advantageously, by having a domain model being part of the application, the system provides consistency of the application whenever it is packaged and delivered. The various entity-aware designers guide an application developer through the domain model in a smart way when expressing process logic. Through EIS connectors, application developers can integrate modeled entities with external entities that reside in external systems. Furthermore, with the concept of compositional modeling, application developers can add behavior to their application by selecting and configuring entity building blocks that are delivered as part of the application development platform. This takes away the need to (re)engineer behavior over and over again, thereby reducing the time-to-value when developing applications. Accordingly, entity building blocks can advantageously enrich the underlying application development platform with more functionality in a modular way.

In contrast to the inventive methods, systems, approaches and techniques described herein, conventional, entity modeling can involve tedious, technically complex processes. A solution builder in modeling a solution process in a certain problem domain may use various software tools to define database entities, specify properties and relations for these database entities, create forms using these database properties, and define rules for applying constraints where necessary. For example, suppose a retention rule applies to all interview records in a hiring process, a solution builder may need to define retention management entities such as "expiration date for legal hold" and "authorization for release of legal hold," etc. outside of a prior entity modeling system and bring them into the solution by using a connector to work with the entities as services. These services are then used in XForms, Processes, etc. to explicitly fetch an item as an XML message which is then accessed via XPath expressions.

Such a message-oriented approach leaves the responsibility for managing item data life cycles in the hands of the solution builder and requires the solution builder to have a deep understanding of XML messages, due to the very complex syntax used in the XML messages, as well as knowledge of the contents in the XML messages as these services generally lack assistance in user experience (UX) components. Consequently, interaction with entity properties in prior entity modeling systems can be complex, challenging, and error-prone. Furthermore, these XML messages do not capture the relationships between entities. This leads to frequent use of XML mapping.

Other drawbacks may include performance issues, coding issues, etc. For example, performance optimization of browser/server interaction in prior entity modeling systems requires coding in the application server. Integration with some case management systems may also require coding as there is no relationship notion in such systems. In some systems, logic may be coded into the "edges" of an application (e.g., in forms), making it difficult to maintain such applications.

Figure 12:
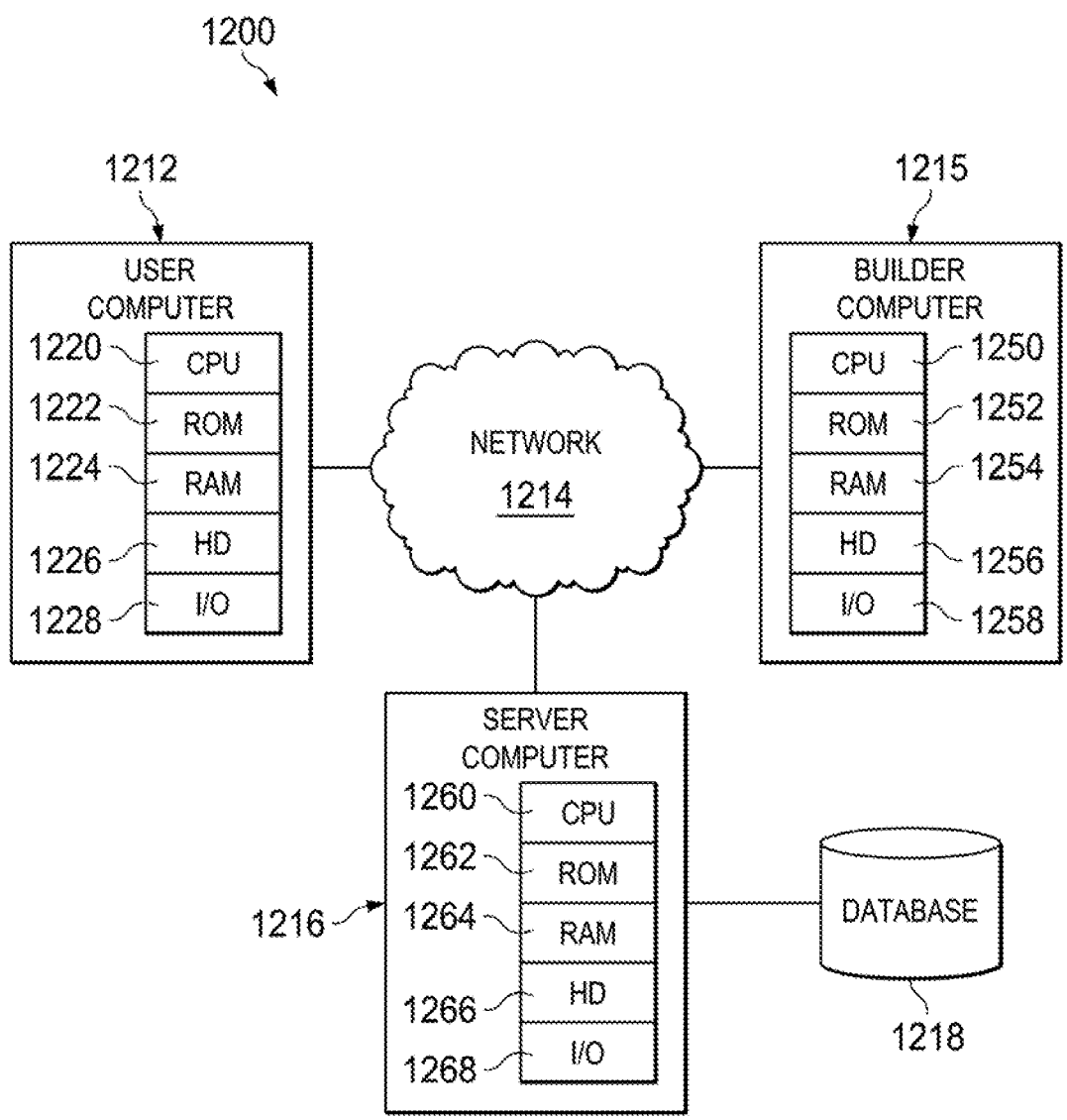
FIG. 12 depicts a diagrammatic representation of an example of an enterprise computing environment where embodiments disclosed can be implemented.

FIG. 12 illustrates an exemplary architecture for enterprise computing environment 1200 that includes network 1214 that can be bi-directionally coupled to user computer 1212, builder computer 1215, and server computer 1216. Server computer 1216 can be bi-directionally coupled to database 1218. Network 1214 may represent a combination of internal and external networks that enterprise computing environment 1200 may utilize for various types of network communications known to those skilled in the art.

For the purpose of illustration, a single system is shown for each of user computer 1212, builder computer 1215, and server computer 1216. However, within each of user computer 1212, builder computer 1215, and server computer 1216, a plurality of computers (not shown) may be interconnected to each other over network 1214. For example, a plurality of user computers 1212 and a plurality of builder computers 1215 may be coupled to network 1214. User computers 1212 may include data processing systems for individuals whose jobs may not require them to develop applications. Builder computers 1215 may include data processing systems for individuals whose jobs may require them to develop applications for use in enterprise computing environment 1200.

User computer 1212 can include central processing unit ("CPU") 1220, read-only memory ("ROM") 1222, random access memory ("RAM") 1224, hard drive ("HD") or storage memory 1226, and input/output device(s) ("I/O") 1228. I/O 1228 can include a keyboard, monitor, printer, electronic pointing device (e.g., mouse, trackball, stylus, etc.), or the like. User computer 1212 can include a desktop computer, a laptop computer, a personal digital assistant, a cellular phone, or nearly any device capable of communicating over a network. Builder computer 1215 may be similar to user computer 1212 and can comprise CPU 1250, ROM 1252, RAM 1254, HD 1256, and I/O 1258.

Likewise, server computer 1216 may include CPU 1260, ROM 1262, RAM 1264, HD 1266, and I/O 1268. Server computer 1216 may include one or more backend systems employed by an enterprise to operate and/or maintain information in enterprise computing environment 1200. One example of such a backend system can be a database management system for database 1218. Many other alternative configurations are possible and known to skilled artisans.

Each of the computers in FIG. 12 may have more than one CPU, ROM, RAM, HD, I/O, or other hardware components. For the sake of brevity, each computer is illustrated as having one of each of the hardware components, even if more than one is used. Each of computers 1212, 1215, and 1216 is an example of a data processing system. ROM 1222, 1252, and 1262; RAM 1224, 1254, and 1264; HD 1226, 1256, and 1266; and database 1218 can include media that can be read by CPU 1220, 1250, or 1260. Therefore, these types of memories include non-transitory computer-readable storage media. These memories may be internal or external to computers 1212, 1215, or 1216.

Portions of the methods described herein may be implemented in suitable software code that may reside within ROM 1222, 1252, or 1262; RAM 1224, 1254, or 1264; or HD 1226, 1256, or 1266. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a non-transitory computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved in many ways. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory.

Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
    providing, by an entity modeling system executing on a processor, an entity composition function through a user interface on a user device;
    receiving, by the entity modeling system through the entity composition function, an instruction to model an entity, wherein an entity model refers to a type of data model that describes and defines a computer-implemented solution process in a problem domain, the solution process including entities that are linked with each other by relationships that specify dependencies and requirements between the entities in the problem domain;
    generating, by the entity modeling system, a visualization containing a name of the entity, visual representations of entity building blocks, and user interface elements for composing the entity through manipulation of the visual representations of the entity building blocks, the entity building blocks representing a subset of elements of the entity modeling system, the entity building blocks having a plurality of entity building block types;
    receiving, by the entity modeling system through the user interface, an indication to add an entity building block to the entity, the entity building block having an entity building block type of the plurality of building block types;
    presenting, by the entity modeling system through the user interface, a configuration form that corresponds to the entity building block type, the configuration form having a user-configurable setting for the entity building block;
    receiving, by the entity modeling system through the user interface, an instruction to add the entity building block to the entity with the user-configurable setting for the entity building block; and
    automatically adding, by the entity modeling system, the user-configurable setting for the entity building block to the entity, wherein adding the entity building block to the entity adds an action to the entity, adds a permission to the entity, or alters a behavior of the entity.

2. The method according to claim 1, further comprising:
    creating the entity building blocks; and
    registering the entity building blocks with the entity modeling system.

3. The method according to claim 1, further comprising:
    retrieving an external entity from a system external to the entity modeling system.

4. The method according to claim 3, further comprising:
    presenting, through the visualization, the external entity as a child entity of the entity.

5. The method according to claim 1, wherein the plurality of building block types comprise a property entity building block type, a relationship entity building block type, and a rule entity building block type.

6. The method according to claim 1, wherein the action is invokable programmatically or triggerable interactively.

7. An entity modeling system, comprising:
    a processor;
    a non-transitory computer-readable medium; and
    stored instructions translatable by the processor to perform:
        providing an entity composition function through a user interface on a user device;
        receiving, through the entity composition function, an instruction to model an entity, wherein an entity model refers to a type of data model that describes and defines a computer-implemented solution process in a problem domain, the solution process including entities that are linked with each other by relationships that specify dependencies and requirements between the entities in the problem domain;
        generating a visualization containing a name of the entity, visual representations of entity building blocks, and user interface elements for composing the entity through manipulation of the visual representations of the entity building blocks, the entity building blocks representing a subset of elements of the entity modeling system, the entity building blocks having a plurality of entity building block types;

receiving, through the user interface, an indication to add an entity building block to the entity, the entity building block having an entity building block type of the plurality of building block types;

presenting, through the user interface, a configuration form that corresponds to the entity building block type, the configuration form having a user-configurable setting for the entity building block;

receiving, through the user interface, an instruction to add the entity building block to the entity with the user-configurable setting for the entity building block; and automatically adding the user-configurable setting for the entity building block to the entity, wherein adding the entity building block to the entity adds an action to the entity, adds a permission to the entity, or alters a behavior of the entity.

8. The entity modeling system of claim 7, wherein the stored instructions are further translatable by the processor to perform:

creating the entity building blocks; and registering the entity building blocks with the entity modeling system.

9. The entity modeling system of claim 7, wherein the stored instructions are further translatable by the processor to perform:

retrieving an external entity from a system external to the entity modeling system.

10. The entity modeling system of claim 9, wherein the stored instructions are further translatable by the processor to perform:

presenting, through the visualization, the external entity as a child entity of the entity.

11. The entity modeling system of claim 7, wherein the plurality of building block types comprise a property entity building block type, a relationship entity building block type, and a rule entity building block type.

12. The entity modeling system of claim 7, wherein the action is invokable programmatically or triggerable interactively.

13. A computer program product comprising a non-transitory computer-readable medium storing instructions translatable by a processor of an entity modeling system for:

providing an entity composition function through a user interface on a user device;

receiving, through the entity composition function, an instruction to model an entity, wherein an entity model refers to a type of data model that describes and defines a computer-implemented solution process in a problem domain, the solution process including entities that are linked with each other by relationships that specify dependencies and requirements between the entities in the problem domain;

generating a visualization containing a name of the entity, visual representations of entity building blocks, and user interface elements for composing the entity through manipulation of the visual representations of the entity building blocks, the entity building blocks representing a subset of elements of the entity modeling system, the entity building blocks having a plurality of entity building block types;

receiving, through the user interface, an indication to add an entity building block to the entity, the entity building block having an entity building block type of the plurality of building block types;

presenting, through the user interface, a configuration form that corresponds to the entity building block type, the configuration form having a user-configurable setting for the entity building block;

receiving, through the user interface, an instruction to add the entity building block to the entity with the user-configurable setting for the entity building block; and automatically adding the user-configurable setting for the entity building block to the entity, wherein adding the entity building block to the entity adds an action to the entity, adds a permission to the entity, or alters a behavior of the entity.

14. The computer program product of claim 13, wherein the instructions are further translatable by the processor to perform:

creating the entity building blocks; and registering the entity building blocks with the entity modeling system.

15. The computer program product of claim 13, wherein the instructions are further translatable by the processor to perform:

retrieving an external entity from a system external to the entity modeling system.

16. The computer program product of claim 15, wherein the instructions are further translatable by the processor to perform:

presenting, through the visualization, the external entity as a child entity of the entity.

17. The computer program product of claim 13, wherein the plurality of building block types comprise a property entity building block type, a relationship entity building block type, and a rule entity building block type.

* * * * *